United States Patent
Hao

(10) Patent No.: US 10,345,662 B2
(45) Date of Patent: Jul. 9, 2019

(54) ARRAY SUBSTRATES AND DISPLAY PANELS

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 147 days.

(21) Appl. No.: 15/518,809

(22) PCT Filed: Apr. 6, 2017

(86) PCT No.: PCT/CN2017/079548
§ 371 (c)(1),
(2) Date: Apr. 13, 2017

(87) PCT Pub. No.: WO2018/152936
PCT Pub. Date: Aug. 30, 2018

(65) Prior Publication Data
US 2018/0299720 A1    Oct. 18, 2018

(30) Foreign Application Priority Data
Feb. 27, 2017 (CN) .......................... 2017 1 0108266

(51) Int. Cl.
*G02F 1/1362* (2006.01)
*G02F 1/1368* (2006.01)

(52) U.S. Cl.
CPC ........ *G02F 1/13624* (2013.01); *G02F 1/1368* (2013.01); *G02F 1/136286* (2013.01)

(58) Field of Classification Search
CPC ............. G02F 1/13306; G02F 1/13624; G02F 1/13628; G02F 1/1368
See application file for complete search history.

(56) References Cited

U.S. PATENT DOCUMENTS

| | | | |
|---|---|---|---|
| 6,862,013 B2 | 3/2005 | Takeuchi et al. | |
| 8,957,839 B2 | 2/2015 | Hu et al. | |
| 2004/0041153 A1 | 3/2004 | Lee | |
| 2008/0001882 A1 | 1/2008 | Lee | |
| 2009/0284674 A1* | 11/2009 | Chang ............... | G02F 1/133707 349/38 |
| 2013/0057794 A1* | 3/2013 | Hou .................. | G02F 1/133365 349/43 |
| 2013/0141417 A1 | 6/2013 | Chen | |
| 2013/0278572 A1 | 10/2013 | Lee et al. | |

* cited by examiner

*Primary Examiner* — Afroza Chowdhury
(74) *Attorney, Agent, or Firm* — Andre C. Cheng

(57) ABSTRACT

The present disclosure relates to an array substrate and a display panel. The array substrate includes a plurality of scanning lines, a plurality of data lines, and at least one low voltage line. The scanning lines and the data lines intersect with other to form a plurality of pixel cells. Each of the pixel cells includes a first transistor. At least one of the pixel cell further includes a second transistor having a first end, a second end, and a control end. The first end connects to the control end of the first transistor, and the control end connects to a succeeding scanning line. The succeeding scanning line is turned on after the scanning line at a current level is turned on, and the scanning line corresponds to the pixel cell where the second transistor is located.

5 Claims, 5 Drawing Sheets

ARRAY SUBSTRATES AND DISPLAY PANELS

BACKGROUND OF THE INVENTION

1. Field of the Invention

The present disclosure relates to liquid crystal display (LCD) technology, and more particularly to an array substrate and a display panel.

2. Discussion of the Related Art

LCDs typically are characterized by attributes including thin, power-saving, and low radiation, and thus have been widely adopted by display products, such as TV, Monitor, Notebook, and App.

With the increase of the resolution and the dimension of the LCDs, the charging rate of the LCDs is getting lower, which cannot satisfy the requirement of high resolution and large dimension.

SUMMARY

The present disclosure relates to an array substrate and a display panel for increasing the charging time period of the pixels so as to enhance the charging rate of the pixels and to reduce the risk of erroneous charging process. In this way, the display performance of the LCD may be enhanced.

In one aspect, an array substrate includes: a plurality of scanning lines, a plurality of data lines, and at least one low voltage line; the scanning lines and the data lines intersecting with other to form a plurality of pixel cells; each of the pixel cells includes a first transistor, and at least one of the pixel cell further includes a second transistor having: a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line; each of the pixel cells being configured with one second transistor; and the array substrate further includes a scanning driving circuit providing scanning signals to the scanning line.

Wherein the succeeding scanning line is adjacent to the scanning line at the current level.

Wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

In another aspect, an array substrate includes: a plurality of scanning lines, a plurality of data lines, and at least one low voltage line; the scanning lines and the data lines intersecting with other to form a plurality of pixel cells; each of the pixel cells includes a first transistor, and at least one of the pixel cell further includes a second transistor having: a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line.

Wherein each of the pixel cells being configured with one second transistor.

Wherein the succeeding scanning line is adjacent to the scanning line at the current level.

Wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

Wherein the pixel cell corresponding to color filters of the same color comprises one second transistor.

Wherein the succeeding scanning line is adjacent to the scanning line at the current level.

Wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

Wherein the array substrate further comprises a scanning driving circuit providing scanning signals to the scanning line.

Wherein the array substrate further comprises a data driving circuit providing grayscale signals to the data lines.

In another aspect, a display panel includes: an array substrate, an opposite substrate opposite to the array substrate, and a liquid crystal layer between the array substrate and the opposite substrate; wherein the array substrate includes: a plurality of scanning lines, a plurality of data lines, and at least one low voltage line; the scanning lines and the data lines intersecting with other to form a plurality of pixel cells; each of the pixel cells includes a first transistor, and at least one of the pixel cell further includes a second transistor having: a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line.

Wherein each of the pixel cells comprises one second transistor, or the pixel cells correspond to the same color filter comprises one second transistor.

Wherein the succeeding scanning line is adjacent to the scanning line at the current level.

Wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

In view of the above, by configuring the second transistor (T2) within the pixel cell and by connecting the control end of the second transistor (T2) to the succeeding scanning line, the pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

DETAILED DESCRIPTION OF THE EMBODIMENTS

Embodiments of the invention will now be described more fully hereinafter with reference to the accompanying drawings, in which embodiments of the invention are shown.

Figure 1:
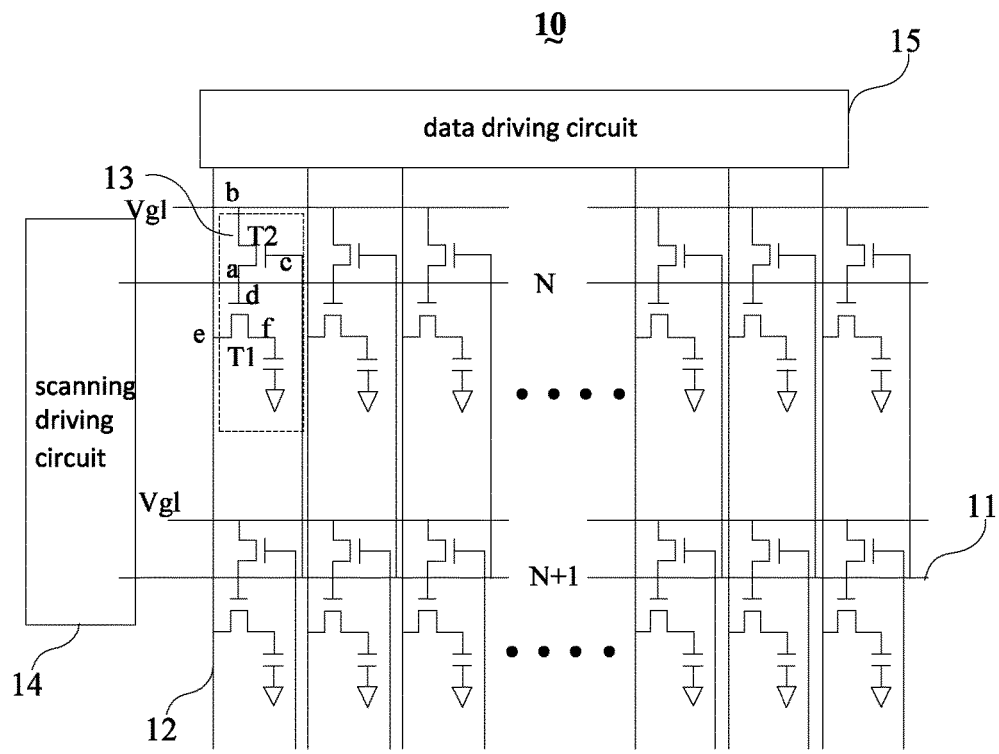
FIG. 1 is a schematic view of the array substrate in accordance with a first embodiment of the present disclosure.

FIG. 1 is a schematic view of the array substrate in accordance with a first embodiment of the present disclosure.

The array substrate 10 includes a plurality of scanning lines 11, a plurality of data lines 12, and at least one low voltage line (Vg1), wherein the scanning lines 11 and the data lines 12 intersect with other to form a plurality of pixel cells 13.

Each of the pixel cells 13 includes a first transistor (T1) for controlling a voltage of the pixel electrode within the array substrate 10. The at least one pixel cells 13 further includes a second transistor (T2) including a first end (a), a second end (b), and a control end (c), wherein the first end (a) connects to the control end (c) of the first transistor (T1), the control end (c) connects to the succeeding scanning line. The succeeding scanning line is turned on after the scanning line at a current level, which corresponds to the pixel cell 13 where the second transistor (T2) is located, is turned on. The second end (b) connects to the low voltage line (Vg1) for quickly pulling down the scanning line at the current level to be at a low potential after the succeeding scanning line is turned on.

The array substrate 10 further includes a scanning driving circuit 14 and a data driving circuit 15, wherein the scanning driving circuit 14 provides the scanning signals to the scanning line, and the data driving circuit 15 provides grayscale signals to the data lines.

Referring to FIG. 1, in one example, each of the pixel cells 13 includes one second transistor (T2). The succeeding scanning line is turned on after the scanning line at a current level, which corresponds to the pixel cell 13 where the second transistor (T2) is located, is turned on. The succeeding scanning line is adjacent to the scanning line of the current level. Taking the pixel cell at the N-th level as one example, the pixel cell 13 is defined by two adjacent low voltage lines (Vg1) and two adjacent data lines. The first transistor (T1) and the pixel electrode are configured within the area defined by two adjacent data lines, the scanning line of the pixel cell 13 at the N-th level, and the low voltage line (Vg1) at the (N+1)-th level. The second transistor (T2) of the pixel cell 13 is configured within the area defined by the two adjacent data lines, the scanning line of the pixel cell 13 at the N-th level, and the low voltage line (Vg1) at the current level.

Wherein the first transistor (T1) of the pixel cell 13 at the N-th level also includes a control end (d), a first end (e), and a second end (f). The control end (d) connects to the scanning line at the current level, the first end (e) connects to the data line, and the second end (f) connects to the pixel electrode. The first end (a) of the second transistor (T2) of the pixel cell 13 at the N-th level connects to the control end (d) of the first transistor (T1), and the second end (b) connects to the low voltage line (Vg1) at the current level, and the control end (c) connects to the scanning line at the (N+1)-th level.

Figure 2:
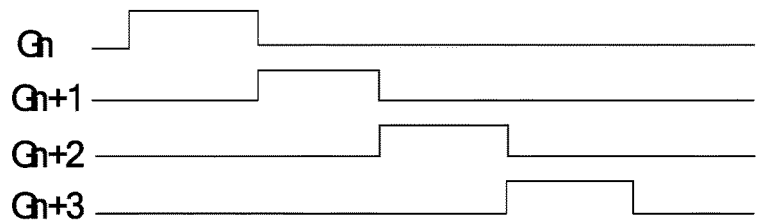
FIG. 2 is a schematic view showing timing sequence in accordance with the first embodiment of the present disclosure.
Figure 2:
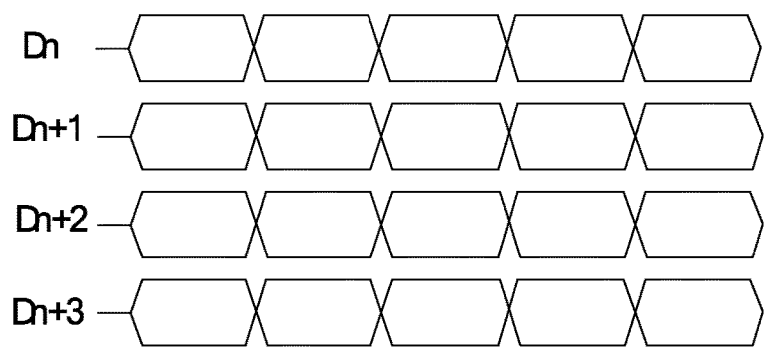

FIG. 2 is a schematic view showing timing sequence in accordance with the first embodiment of the present disclosure. Also referring to FIG. 1, the pixel cell 13 at the N-th level is taken as one example. A falling edge of the scanning signals of the scanning line at the current level correspond to a rising edge of the scanning signals of the scanning line at the (N+1)-th level.

Specifically, when the scanning driving circuit 14 provides the scanning signals to the scanning line, i.e., when the scanning line in FIG. 2 is at the high potential, the control end (d) of the first transistor (T1) is turned on. At this moment, the data driving circuit 15 provides grayscale signals to the data lines to charge the pixel electrode via the first transistor (T1). The pixel electrode may be any one of the red pixel electrode, the green pixel electrode, the blue pixel electrode, and the white pixel electrode. When the pixel electrode of the current level is fully charged, the scanning driving circuit 14 provides the high potential to the scanning line at the (N+1)-th level such that when the pixel cell at the (N+1)-th level is turned on, the second transistor (T2) of the pixel cell at the N-th level is turned on accordingly. The second end (b) of the second transistor (T2) connects to the low voltage line (Vg1) such that the scanning signals of the scanning line of the pixel cell at the N-th level drop quickly to the low potential.

In view of the above, by configuring the second transistor (T2) within the pixel cell and by connecting the control end of the second transistor (T2) to the succeeding scanning line, the pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

Figure 3:
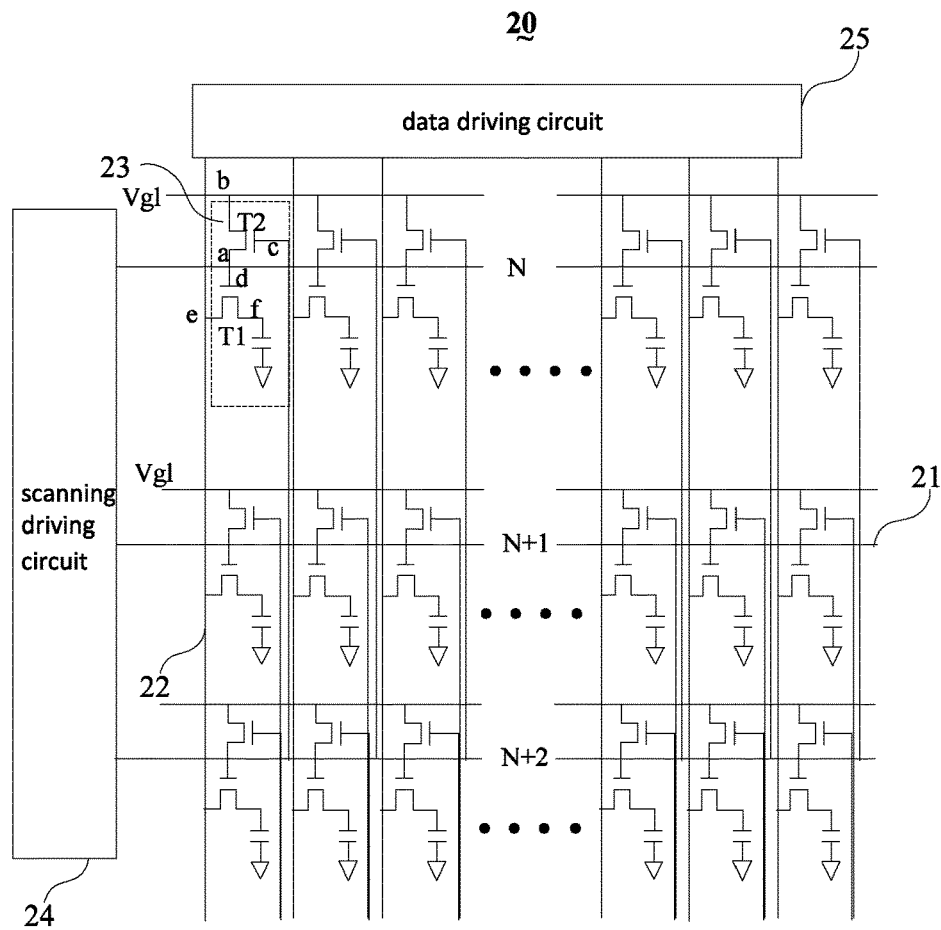
FIG. 3 is a schematic view of the array substrate in accordance with a second embodiment of the present disclosure.

FIG. 3 is a schematic view of the array substrate in accordance with a second embodiment of the present disclosure. The difference between the second embodiment and the first embodiment will be described hereinafter. In the first embodiment, the succeeding scanning line is adjacent to the scanning line at the current level, that is, the control end of the second transistor (T2) of the pixel cell at the N-th level connects to the scanning line of the pixel cell at the (N+1)-th level. In the second embodiment, at least one scanning line at another level is configured between the succeeding scanning line and the scanning line of the pixel cell at the N-th level. In addition, the number of the scanning lines being arranged between the succeeding scanning line and the scanning line at the N-th level equals to a ratio of a pre-charging period to a normal charging period of the pixel cell where the second transistor (T2) is located. In the embodiment, the control end of the second transistor (T2) of the pixel cell at the N-th level connects to the scanning line of the pixel cell at the (N+2)-th level.

In FIG. 3, the array substrate 20 includes a plurality of scanning lines 21, a plurality of data lines 22, and at least one low voltage line (Vg1), wherein the scanning lines 21 and the data lines 22 intersect with other to form a plurality of pixel cells 23. The array substrate 20 further includes a scanning driving circuit 24 and a data driving circuit 25, wherein the scanning driving circuit 24 provides the scanning signals to the scanning line, and the data driving circuit 25 provides grayscale signals to the data lines.

Taking the pixel cell 23 at the N-th level as one example. Each of the pixel cell 23 includes a first transistor (T1) for controlling a voltage of the pixel electrode within the array substrate 20. The at least one pixel cells 13 further includes a second transistor (T2) including a first end (a), a second end (b), and a control end (c), wherein the first end (a) connects to the control end (d) of the first transistor (T1), the control end (c) connects to the scanning line of the pixel cell at the (N+2)-th level, the second end (b) connects to the low voltage line (Vg1) for quickly pulling down the scanning line at the current level to be at the low potential after the scanning line at the (N+2)-th level is turned on.

Figure 4:
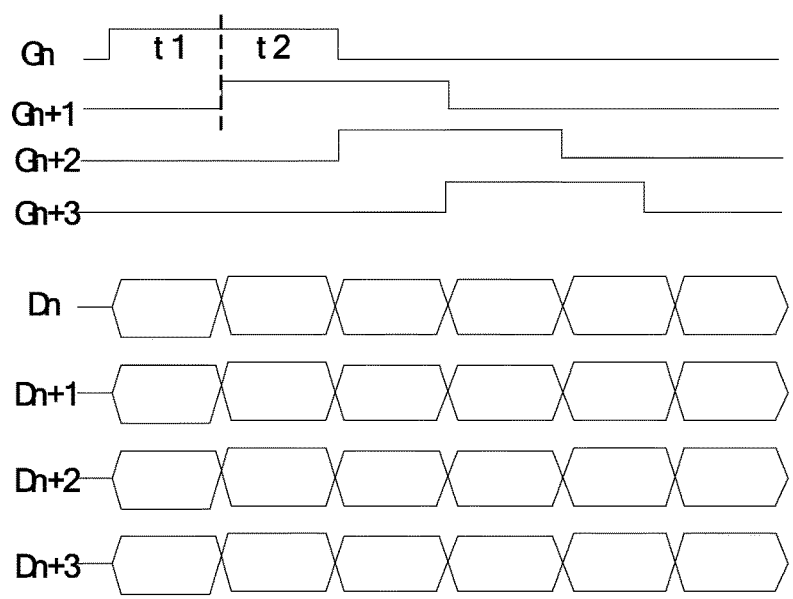
FIG. 4 is a schematic view showing timing sequence in accordance with the second embodiment of the present disclosure.

FIG. 4 is a schematic view showing timing sequence in accordance with the second embodiment of the present disclosure. Also referring to FIG. 2, the pixel cell 23 at the N-th level is taken as one example. A falling edge of the scanning signals of the scanning line at the current level correspond to a rising edge of the scanning signals of the scanning line at the (N+2)-th level.

When a period of the rising edge of the scanning signals of the scanning lines 21 is too long, usually, a pre-charge driving method is adopted to charge the pixel circuit structure. With respect to the pre-charge driving method, before the scanning line at the current level is driven to find the address, the scanning driving circuit 24 provides the high potential to the scanning line at the current level to turn on the first transistor (T1) so as to conduct the pre-charge process to the pixel at the current level. As shown in FIG. 4, the half early period (t1) defined by the dashed line relates to the pre-charge period, and the half later period (t2) defined by the dashed line relates to the normal charging period. In the second embodiment, the half early period (t1) is the same with the half later period (t2). Also, in view of FIG. 4, it can be conceived that the pixel cell at the (N+1)-th level turns on the first transistor (T1) to conduct the pre-charge process before the pixel cell at the N-th level enters the normal charging period.

When the pixel cell at the N-th level is fully charged, the scanning driving circuit 24 provides the high potential to the scanning line at the (N+2)-th level such that the second transistor (T2) of the pixel cell at the N-th level is turned on right after the pixel cell at the (N+2)-th level is turned on. The second end (b) of the second transistor (T2) connects to the low voltage line (Vg1) such that the scanning signals of the scanning line of the pixel cell at the N-th level quickly drops to the low potential. In other embodiment, the control end (c) of the second transistor (T2) of the pixel cell at the N-th level may connect to the scanning line other than the scanning line of the pixel cell at the (N+2)-th level. Specifically, this is determined in accordance with the pre-charge period of the pixel cell at the N-th level. In an example, when $t1=(m+1)*t2$, and m is a positive integer, the control end (c) of the second transistor (T2) of the pixel cell at the N-th level connects to the scanning line of the pixel cell at the (N+m)-th row.

In view of the above, by configuring the second transistor (T2) within the pixel cell and by connecting the control end of the second transistor (T2) to the succeeding scanning line, the pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

Figure 5:
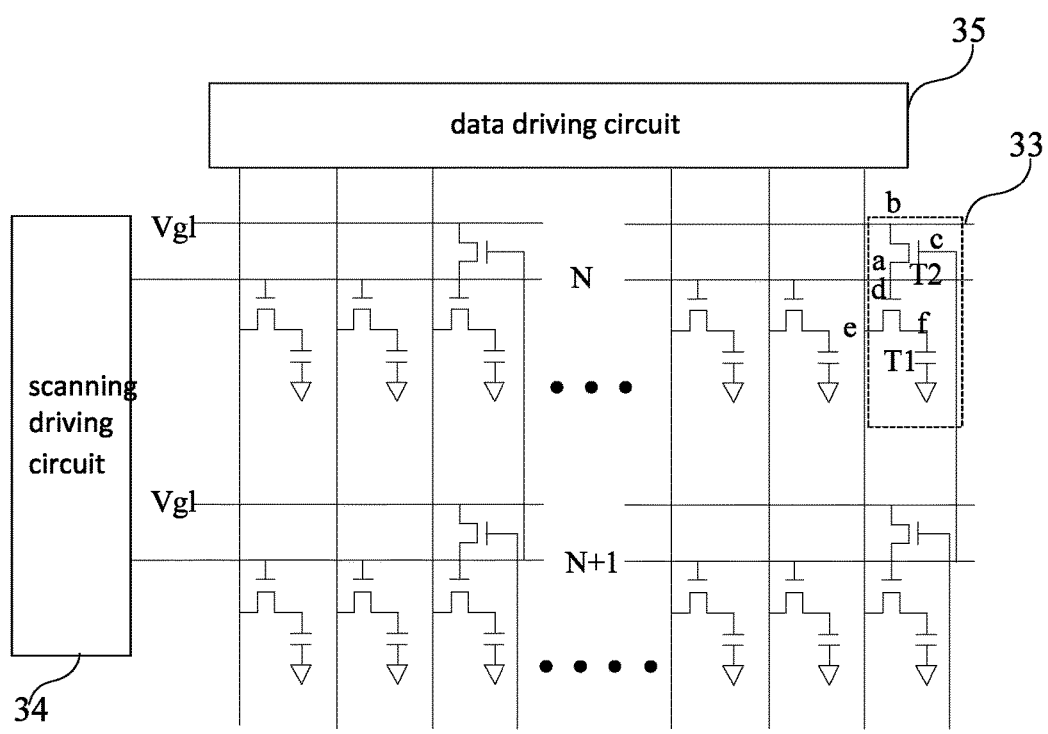
FIG. 5 is a schematic view of the array substrate in accordance with a third embodiment of the present disclosure.

FIG. 5 is a schematic view of the array substrate in accordance with a third embodiment of the present disclosure. In the third embodiment, each of the pixel cells includes one second transistor (T2). The pixel cell corresponding to the color filters of the same color includes one second transistor (T2). That is, with respect to the pixel cell at the N-th level, the second transistor (T2) may be configured within the sub-pixel corresponding to any one of the red color filter, the green color filter, and the blue color filter.

The array substrate 30 includes a plurality of scanning lines 31, a plurality of data lines 32, and at least one low voltage line (Vg1), wherein the scanning lines 31 and the data lines 32 intersect with other to form a plurality of pixel cells 33.

The array substrate 30 further includes a scanning driving circuit 34 and a data driving circuit 35, wherein the scanning driving circuit 34 provides the scanning signals to the scanning line 31, and the data driving circuit 35 provides grayscale signals to the data lines 32.

Taking the pixel cell 33 at the N-th level as one example. Each of the pixel cell 33 includes a first transistor (T1) for controlling a voltage of the pixel electrode within the array substrate 30. In an example, the sub-pixel corresponding to the blue color filter is illustrated. That is, the second transistor (T2) is configured within the pixel cell 33. The pixel cell 33 is within the area defined by the two adjacent low voltage line (Vg1) and two adjacent data lines. The first transistor (T1) and the pixel electrode of the pixel cell 33 are configured within the area defined by two adjacent data lines, the scanning line of the pixel cell 33 at the N-th level, and the low voltage line (Vg1) at the (N+1)-th level. The second transistor (T2) of the pixel cell 33 is configured within the area defined by the two adjacent data lines, the scanning line of the pixel cell 33 at the N-th level, and the low voltage line (Vg1) at the current level.

The control end (d) of the first transistor (T1) of the pixel cell 33 at the N-th level connects to the scanning line at the current level, the first end (e) connects to the data lines, and the second end (f) connects to the pixel electrode. The first end (a) of the second transistor (T2) connects to the control end (d) of the first transistor (T1), the second end (b) connects to the low voltage line (Vg1) at the current level, and the third end (c) connects to the scanning line at the next level.

Also referring to FIG. 2, when the scanning signals of the pixel cell at the N-th level are high potential, the control end (d) of the first transistor (T1) is turned on. At this moment, the data driving circuit 15 provides grayscale signals to the data lines to charge the pixel electrode via the first transistor (T1). When the pixel electrode at the N-th level is fully charged, the scanning driving circuit 34 provides the low potential to turn off the scanning line at the current level and provides the high potential to the scanning line at the (N+1)-th level such that when the pixel cell at the (N+1)-th level is turned on, the second transistor (T2) of the pixel cell at the N-th level is turned on accordingly. The second end (b) of the second transistor (T2) connects to the low voltage line (Vg1) such that the scanning signals of the scanning line of the pixel cell at the N-th level drop quickly to the low potential. In other embodiments, the second transistor (T2) may be configured within the pixel cell corresponding to the red color filter or the green color filter.

In view of the above, by configuring the second transistor (T2) within the pixel cell and by connecting the control end of the second transistor (T2) to the succeeding scanning line, the pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

Figure 6:
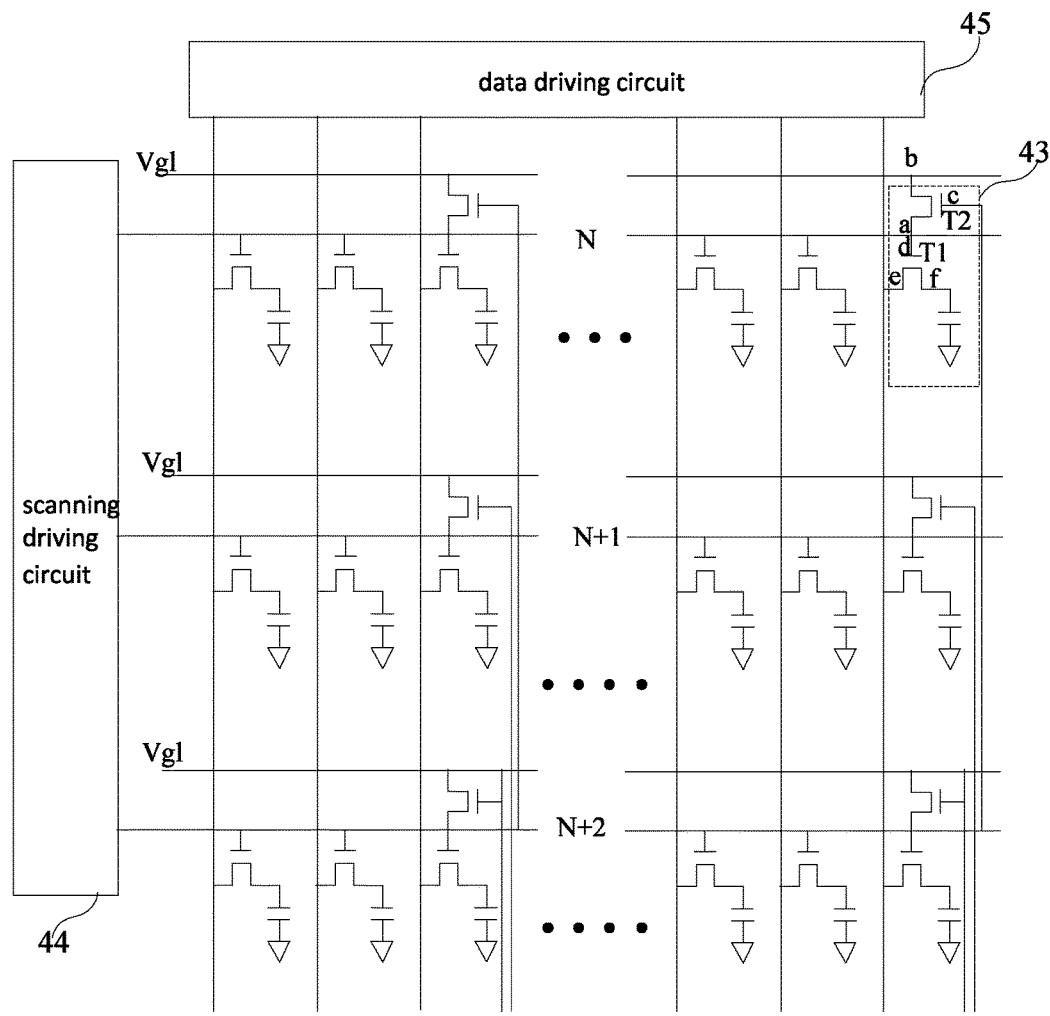
FIG. 6 is a schematic view of the array substrate in accordance with a fourth embodiment of the present disclosure.

FIG. 6 is a schematic view of the array substrate in accordance with a fourth embodiment of the present disclosure. Compared with the third embodiment, the succeeding scanning line in the third embodiment is adjacent to the scanning line at the current level. That is, The control end of the second transistor (T2) of the pixel cell at the N-th level connects to the scanning line of the pixel cell at the (N+1)-th level. The succeeding scanning line in the third embodiment and the scanning line of the pixel cell at the N-th level are separated by the scanning line configured at least one level. The number of the scanning lines being arranged between the succeeding scanning line and the scanning line at the current level equals to a ratio of the pre-charging period to the normal charging period of the pixel cell where the second transistor (T2) is located. In the embodiment, the control end of the second transistor (T2) of the pixel cell at the N-th level connects to the scanning line of the pixel cell at the (N+2)-th level.

In FIG. 6, the array substrate 40 includes a plurality of scanning lines 41, a plurality of data lines 42, and at least one low voltage line (Vg1), wherein the scanning lines 41 and the data lines 42 intersect with other to form a plurality of pixel cells 43. The array substrate 40 further includes a scanning driving circuit 44 and a data driving circuit 45, wherein the scanning driving circuit 44 provides the scanning signals to the scanning line 41, and the data driving circuit 45 provides grayscale signals to the data lines 42.

Taking the pixel cell 43 at the N-th level as one example. Each of the pixel cell 43 includes a first transistor (T1) for controlling a voltage of the pixel electrode within the array substrate 40. The at least one pixel cells 13 further includes a second transistor (T2) including a first end (a), a second end (b), and a control end (c), wherein the first end (a) connects to the control end (d) of the first transistor (T1), the control end (c) connects to the scanning line (Gn+2) of the pixel cell at the (N+2)-th level, the second end (b) connects to the low voltage line (Vg1) for quickly pulling down the scanning line at the current level to be at the low potential after the scanning line at the (N+2)-th level is turned on. The principles are similar to the second embodiments, and thus are omitted hereinafter.

Figure 7:
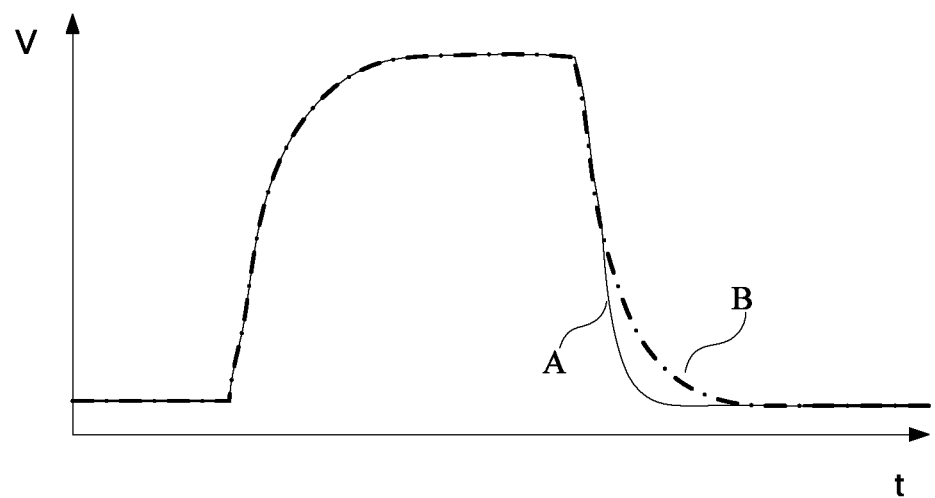
FIG. 7 is a schematic view showing the charging waveforms of the conventional driving method compared with that of the present disclosure.

FIG. 7 is a schematic view showing the charging waveforms of the conventional driving method compared with that of the present disclosure. As shown in FIG. 7, the period of the falling edge of the charging waveform, with respect to the driving method (A) of the present disclosure, is shorter, and the dropping speed of the falling edge is faster. The pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

Figure 8:
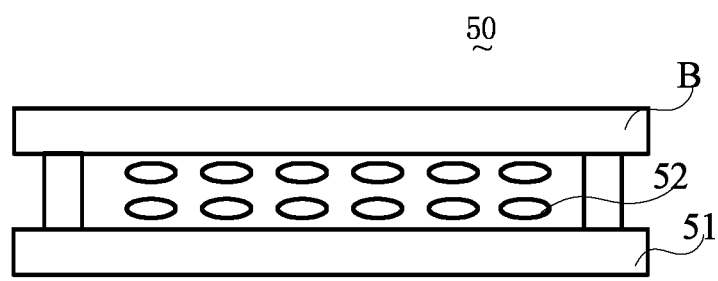
FIG. 8 is a schematic view showing the display panel in accordance with one embodiment of the present disclosure.

FIG. 8 is a schematic view showing the display panel in accordance with one embodiment of the present disclosure. the display panel 50 includes the array substrate (B) in the above embodiment, a common substrate 51 opposite to the array substrate (B), and a liquid crystal layer 52 arranged between the array substrate (B) and the common substrate 51.

In view of the above, by configuring the second transistor (T2) within the pixel cell and by connecting the control end of the second transistor (T2) to the succeeding scanning line, the pulse width of the scanning signals within one scanning period is fixed. Under the circumstance that other conditions remain the same, while the period of the falling edge is shorten, the period for which the scanning signals are maintained at the high potential is extended. That is, the turn-on period of the first transistor (T1) is extended such that the charging period of the pixel electrode is extended. The charging rate of the pixel is enhanced, and the risk of erroneously charging may be reduced. Thus, the display performance of the LCD may be enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. An array substrate, comprising:
a plurality of scanning lines, a plurality of data lines, and at least one low voltage line;
the scanning lines and the data lines intersecting with other to form a plurality of pixel cells;

each of the pixel cells comprising a first transistor, and at least one of the pixel cell further comprising a second transistor having:

a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line;

each of the pixel cells being configured with one second transistor; and the array substrate further comprising a scanning driving circuit providing scanning signals to the scanning line;

wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

2. An array substrate, comprising:

a plurality of scanning lines, a plurality of data lines, and at least one low voltage line;

the scanning lines and the data lines intersecting with other to form a plurality of pixel cells;

each of the pixel cells comprising a first transistor, and at least one of the pixel cell further comprising a second transistor having:

a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line;

wherein the pixel cell corresponding to color filters of the same color comprises one second transistor;

wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

3. The array substrate as claimed in claim 2, wherein the array substrate further comprises a scanning driving circuit providing scanning signals to the scanning line.

4. The array substrate as claimed in claim 2, wherein the array substrate further comprises a data driving circuit providing grayscale signals to the data lines.

5. A display panel, comprising:

an array substrate, an opposite substrate opposite to the array substrate, and a liquid crystal layer between the array substrate and the opposite substrate;

wherein the array substrate comprising:

a plurality of scanning lines, a plurality of data lines, and at least one low voltage line;

the scanning lines and the data lines intersecting with other to form a plurality of pixel cells;

each of the pixel cells comprising a first transistor, and at least one of the pixel cell further comprising a second transistor having:

a first end, a second end, and a control end, wherein the first end connects to the control end of the first transistor, the control end connects to a succeeding scanning line, the succeeding scanning line is turned on after the scanning line at a current level is turned on, and the scanning line corresponds to the pixel cell where the second transistor is located, a falling edge of the scanning signals of the scanning line at the current level correspond to a rising edge of the scanning signals of the scanning line at the succeeding level, and the second end connects to the low voltage line;

wherein each of the pixel cells comprises one second transistor, or the pixel cells correspond to the same color filter comprises one second transistor;

wherein the succeeding scanning line and the scanning line at the current level are separated by the scanning line of at least one level, and a number of the scanning lines being arranged between the succeeding scanning line and the scanning line at the current level equals to a ratio of a pre-charging period to a normal charging period of the pixel cell where the second transistor is located.

\* \* \* \* \*